United States Patent [19]

Hagen et al.

[11] 4,354,261

[45] Oct. 12, 1982

[54] CIRCUIT ARRANGEMENT AND METHOD FOR MULTI-ADDRESS SWITCHING OPERATIONS

[75] Inventors: Rolf Hagen, Unterhaching; Diethard Linck, Munich; Joerg Pappenberger, Rosenheim, all of Fed. Rep. of Germany

[73] Assignee: Siemens Aktiengesellschaft, Berlin and Munich, Fed. Rep. of Germany

[21] Appl. No.: 129,396

[22] Filed: Mar. 10, 1980

[30] Foreign Application Priority Data

Mar. 30, 1979 [DE] Fed. Rep. of Germany ....... 2912825

[51] Int. Cl.³ .......................... H04J 3/16; H04L 5/22
[52] U.S. Cl. ......................................... 370/42; 178/3; 370/84
[58] Field of Search ...................... 370/42, 43, 41, 61, 370/67, 84, 79; 178/3, 4

[56] References Cited

U.S. PATENT DOCUMENTS 3,697,672 10/1972 Reisch ..................................... 178/3
3,804,987 4/1974 Cooper ................................. 370/84
4,058,672 11/1977 Crager et al. ........................... 178/3

FOREIGN PATENT DOCUMENTS 2034559 6/1980 United Kingdom ..................... 178/3

OTHER PUBLICATIONS

*Siemens System EDS; System Description,* Bereich Fernschreibund Datenverkehr, Oct. 1977, (Munich).
"EDS-A New Electronic Data Switching System for Data Communication", Gosslau et al., Nachrichtentechnische Zeitschrift (22), 1969, No. 8, pp. 444–463, (Berlin).
"The Public Switched Data Network of The Deutsche Bundespost ... ", published in Evolutions on Computer Communications, 1978, pp. 9–16.
"A Commercial Test of Digital Networks and its Future Survey", published in International Switching Symposium, Japan, 1976, pp. 441-1-1 to 441-1-8.
"Traffic Handling Characteristics of a Multi-Address Calling System", published in Transactions of the IECE of Japan, vol. E60, 1977, pp. 497–498.
Fully Automatic Multi-Address Service . . . ", published in Siemens Review, XLV (1979), No. 5, pp. 234–238.

*Primary Examiner*—Thomas W. Brown
*Attorney, Agent, or Firm*—Spellman, Joel and Pelton

[57] ABSTRACT

A circuit arrangement for multi-address switching operations of digital encoded signals between a calling data terminal and a variety of called data terminals operating with different data transmission procedures is adapted for use with an electronic data switching system and comprises at least two interface circuits having input/output converting networks. External input terminals of these interface circuits are adapted for connection with respective input/output units of the electronic data switching system for each type of data terminal. Internal input/output terminals are connected to a storage unit for storing a multi-address message, including data information to be transmitted and identification information of the called data terminals. A control unit is provided for controlling the input/output operations and transmitting the buffered data information separately and in sequence to each of the called data terminals one after another across the interface circuit assigned to the currently called type of data terminal and with the respective data transmission procedures.

11 Claims, 1 Drawing Figure

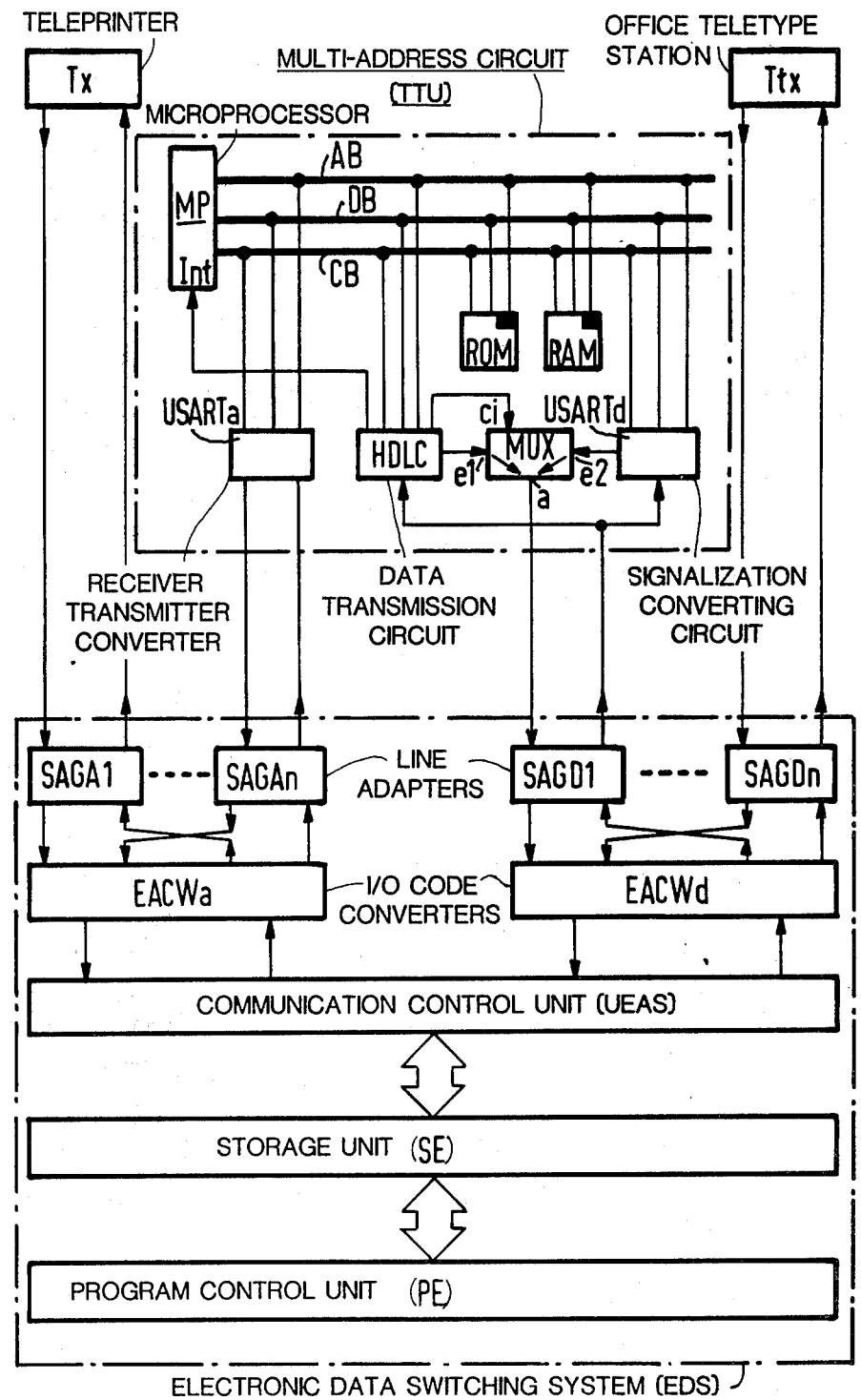

CIRCUIT ARRANGEMENT AND METHOD FOR MULTI-ADDRESS SWITCHING OPERATIONS

BACKGROUND OF THE INVENTION

The present invention is directed to a data communication system which is suitable for multi-address switching.

Recently developed data terminals operate according to different data transmission procedures including signalling, data format and data transmission rate. More specifically, the present invention is directed to a circuit arrangement and method for multi-address switching of digital encoded signals between a calling data terminal and a variety of called data terminals operating with different data transmission procedures. The circuit arrangement is adapted for use with an electronic data switching system which system itself is not capable of setting up physical connections between data terminals of different types.

Methods for establishing multi-address switching between a calling data terminal and a variety of called data terminals under control of the data switching system are known in the art. In the U.S. Pat. No. 3,697,672 to Reisch there is disclosed such a method based upon a separate apparatus containing its own register adapted to receive all information, especially station numbers of data terminals to be called, which is necessary for establishing multi-address connections. This known circuit arrangment for multi-address switching is connectable on its input side over an outgoing line of a data switching system to the system itself. This line is seized through evaluation in the data switching system of a special service number dialed by the calling data terminal. The circuit arrangement for multi-address switching operation is connected to both a central control unit of the data switching system and the communication path to the calling data terminal and thereby to cause request, evaluation, and storage of the information required. Thereafter, the circuit arrangement for multi-address switching operations is physically connected on its output side to the data switching system over a number of incoming communication lines to the corresponding number of data terminals participating in the multi-address operation. These connections via the data switching system are established according to the principle of establishing a single connection.

The circuitry is complex and even complicated and results in a high load to the data switching system in establishing the required multi-address connections.

Furthermore, there have been recently developed data terminals operating with different data transmission procedures. The term "data transmission procedures" hereinafter is understood to include all kinds of circuitry and standards for performing signalling procedures and transmitting data with a specific data format at a specific data rate. Accordingly, data switching systems for digital telecommunication which have been recently developed are suitable for use with different communication networks to handle teleprinter traffic and other data traffic.

A digital switching system of this type is disclosed in the technical manual entitled *Siemens System EDS, System Description*, which is published and distributed by Siemens Corp., Iselin, N.J. and which is incorporated herein by reference. This known electronic digital switching system is capable of handling the above-mentioned different types of data traffic with one exchange, that is the hardware and software is designed to respond to different data transmission procedures for teleprinter traffic and other data traffic simultaneously. However, the constraint of having a complex structure for different signalling, data format, and data rate, restricts the use of one exchange to physical connections within the respective groups of data terminals; that is, data terminals with different data transmission procedures cannot communicate with one another. Referring to multi-address switching operation, consequently only multi-address connections between similar data terminals operating with the same data transmission procedure can be established with known systems.

It is therefore, a main object of the present invention to overcome restrictions of data communication in known data communications systems, especially in establishing multi-address connections.

Another object of the present invention is to provide apparatus adapted for use with an electronic data switching system for establishing multi-address connections between data terminals of different types accordingly operating with different data transmission procedures.

Still another object of the present invention is to provide such an apparatus for establishing multi-address connections without a high burden on the data switching system.

SUMMARY OF THE INVENTION

In the present invention there is disclosed a circuit arrangement for multi-address switching operations of digital encoded signals between a calling data terminal and a variety of called data terminals operating with different data transmission procedures. The circuit arrangement adapted for use with an electronic data switching system is composed of at least two interface circuits, each having an external input, an external output, a first internal input, a first internal output and a first control terminal. The interface circuits comprises input/output converting networks connected to both groups of inputs and outputs. Each of the external inputs is adapted for connection with respective output means for receiving digital signals from one type of data terminal and each of the external outputs is adapted for connection with respective input means of the electronic data switching system. Storage means are provided for storing a message being sent from a calling data terminal, and including data information to be transmitted in a multi-address operation and identification information identifying the called data terminals. These storage means have second internal inputs, a second internal output and a second control terminal. First and second internal inputs are connected in parallel to respective second and first internal outputs. Furthermore, there are provided control means for controlling the input/output operations of the storage means as to send out the buffered data information in sequence to each of the called data terminals, one after another by temporarily set up line connections across a respective interface circuit. The interface circuit assigned to the curently called type of data terminal supplies the data information to a single line connection, thereby operating according to the data transmission procedure of the called type of data terminal. The central data switching system controls the establishment of the line connections as if these were unrelated single line connections between two data terminals of one type.

The present invention advantageously establishes multi-address connections with a relatively simple design, and overcomes the above-mentioned restriction of multi-address connections. Furthermore, the data switching system in itself is not actively controlling the establishment of the various multi-address connections; i.e. from the viewpoint of the digital switching system, multi-address connections are to be handled like simple single line connections between two data terminals of the same type. Additionally, the circuit arrangement for multi-address switching operations is easily adjustable to future needs of data traffic without impact on the digital switching system.

The invention also is directed to a method for performing multi-address switching operation of digital encoded signals between a calling data terminal and a variety of called data terminals operating with different data transmission procedures. The data switching system usually has a communication unit formed of different sets of line adapters for each type of data terminal. When a data terminal requests multi-address connection, the call request is sent to a respective line adapter of one set of line adapters assigned to the sending type of data terminal. The call request information is analyzed by the electronic data switching system. Accordingly, a line connection is set up from the busy line adapter across a second line adapter of the same set of line adapters to the circuit arrangement for multi-address switching operation. This circuit arrangement simulates a data terminal and receives the message of the calling data terminal including identification information referring to the data terminals to be called, and data information to be sent to the various identified data terminals. The whole message is temporarily stored and forms the basic information for establishing multi-address switching operation under control of the circuit arrangement.

In establishing the multi-address connection the circuit arrangement selects an outgoing line adapter of a line adapter set based upon a part of the buffered identification information and sends a call request to the data switching system to build up a single line connection to the identified data terminal. The circuit arrangement thereupon sends the stored data information converted according to the data transmission procedure of the receiving type of data terminal to the selected outgoing line adapter. This information is switched to the receiving data terminal under control of the electronic data switching system as if it were a normal single message. In doing so one single line connection after another to the different data terminals identified in the multi-address message is established until all different data terminals have been reached.

This method adds new design features and switching capabilities to known digital switching systems and makes efficient use of the capabilities and the capacity of a central data switching system without undue load upon the central system.

A better understanding of the invention may be had by reference to the following description of a preferred embodiment in conjunction with the accompanying drawing.

BRIEF DESCRIPTION OF THE DRAWING

The single FIGURE shows a schematic diagram of an electronic data switching system and coupled to this system a circuit arrangement for multi-address switching operation.

DESCRIPTION OF THE PREFERRED EMBODIMENT

In the drawing, a known electronic data switching system EDS is shown schematically. A first data terminal Tx, representing a first type of data terminal and hereinafter referred to as teleprinter, interfaces with a first set of line adapters SAGA1 to SAGAn. A second set of line adapters SAGD1 to SAGDn is assigned to a second group of data terminals including a second data terminal Ttx, hereinafter referred to as office Teletype station. Each set of line adapters SAGA1 to SAGAn and SAGD1 to SAGDn is connected to a respective network of input/output code converters EACWa and EACWd. These networks, in turn, are connected to a communication control unit UEAS communicating with a storage unit SE and a program control unit PE. The design and the facilities of such an electronic data switching system EDS, here shown in a schematic block diagram, are well known to those skilled in the art and are additionally described in the reference mentioned in the Background of the Invention. Further detailed description, therefore, does not seem to be necessary, as the data switching system in itself forms no part of the invention.

Essential for the better understanding of the invention is, however, that each set of line adapters of the electronic data switching system serves a different type of data terminals. The first set of line adapters SAGA1 to SAGAn is assigned, as shown, to teleprinters or data terminals of a type which operate in a start-stop mode. The data transmission rate of a teleprinter usually is 50 baud while a message is encoded according to the International Telegraph Alphabet No. 2. According to this alphabet a character consists of five elements with a preceeding start pulse and succeeding stop pulse.

The second set of line adapters SAGDL1 to SAGDn is assigned to a different type of data terminal, namely office Teletype stations Ttx for example. These data terminals operate with a different data transmission procedure. Office Teletype stations are understood to operate with a synchronous data transmission mode and a data rate of 2,400 bits/second for example. Synchronous data transmission mode means no start/stop pulses are used. The characters are encoded in the form of bit groups or envelopes, whereby normally 8 bits form a data word.

A circuit arrangement for multi-address switching operations TTU, hereinafter called multi-address circuit is connected with this data switching system EDS. The multi-address circuit TTU is connected to the data switching system EDS just like another remote data terminal; however, there is one specific difference: it is connected to both sets of line adapters, thereby simulating, with respect to the data switching system EDS, both a data terminal of the teleprinter type and a data terminal belonging to the group of office Teletype stations. As will become apparent from later description, the multi-address circuit also controls data reformatting and data conversion.

To achieve the basic design feature, the multi-address circuit TTU is connected to one line adapter SAGAn of the first set of line adapters by external inputs and outputs of a first interface circuit USARTa. Furthermore, the multi-address circuit TTU is connected to another line adapter SAGD1 of the second set of line adapters also by external inputs and outputs of a second interface circuit. This second interface circuit is composed of a signalization-conversion circuit USARTd and a data transmission circuit HDLC. Both circuits of the second interface circuit are connected by their external inputs in parallel to the output of the line adapter SAGD1. This line adapter SAGD1, furthermore, is connected by its input to the output a of a multiplexor network MUX which is connected by signal inputs e1, e2 to first outputs of the data transmission circuit HDLC and the signalization conversion circuit USARTd, respectively. The multiplexor network MUX is connected to a control output of the data transmission circuit HDLC via a control line connected to a control input ci of the multiplexor network MUX. A control signal fed to the control input ci of the multiplexor network MUX controls its operating condition. Depending upon the status of this control signal, the multiplexor network MUX connects its output a either with its first signal input e1 or with its second signal input e2. The control of the multiplexor network MUX may be designed such that it switches automatically to one of these operating conditions if the control signal is absent.

The interface circuits described above are composed of well known, commercially available components. The first interface circuit USARTa and the signalization circuit USARTd, forming a part of the second interface circuit are Universal Synchronous Asynchronous Receiver Transmitters, which are sold by Intel Corp. as its component #8251. The data transmission circuit is known as High Level Data Link Control, also sold by Intel Corp. as its component #8273. The multiplexor circuit can be formed of well known components SN 74141 sold by Texas Instruments or any other well recommended semiconductor components manufacturer. Detailed schematics of the individual components, therefore, have not been shown and related detailed description of the design is not necessary for an understanding of the invention.

However, let it be noted here that the described first outputs of the data transmission circuit HDLC and of the signalization-conversion circuit USARTd connected to the inputs e1 and e2 of the multiplexor network MUX, respectively do not deliver signals that have been applied to each one of the circuits by their respective first external inputs. The data transmission circuit HDLC and the signalization-conversion circuit USARTd have second internal inputs, the operation of which inputs will be described in detail, yet. For the moment it may be sufficient to note that just input signals supplied to the internal inputs of the data transmission circuit HDLC or the signalization-conversion circuit USARTd are transmitted to the multiplexor network MUX after processing the same in the respective circuits HDLC and USARTd. It has been described that the operation condition of the multiplexor network MUX is controlled by a control signal sent out by the data transmission HDLC. This control signal is dependent on the main control scheme of the multi-address circuit TTU which still has to be described in full detail.

The above-considered first interface circuit USARTd, the data transmission circuit HDLC and the signalization-conversion circuit USARTd are connected by a number of internal terminals with a control network of the multi-address circuit arrangement TTU. In this embodiment of the invention there is provided a microprocessor system for controlling the multi-address circuit TTU. The microprocessor system is composed of a micro-processor MP, a Read Only Memory, hereinafter referred to as control memory ROM, and a main memory, the Random Access Memory RAM. The main memory stores messages for multi-address connections temporarily, as will become more apparent later. These messages include signalling information identifying data terminals to be called and data information to be transmitted. For transmitting data within this control network, a bus structure having a number of bus lines is provided. First bus lines constitute an address bus AB, second bus lines form a data bus DB and third bus lines represent a control bus CB. According to known principles of micro-processor systems with multibus structure all circuits, the microprocessor MP, the control memory ROM, the main memory RAM, the first interface circuit USARTa, the data transmission circuit HDLC and the signalization-conversion circuit USARTd are connected to the bus structure in parallel.

All circuits forming the microprocessor system, are well known in the art, and commercially available components can be used. The control memory ROM may be composed of an Intel memory component #2732 and the main memory RAM can consist of Intel components #2185. The microprocessor MP in itself may be an Intel processor #8085.

Whereas normally all data, concerning addresses, data information and control signals are transmitted across this bus structure, still another circuit connection is provided. The data transmission circuit HDLC is connected by a separate output to an interrupt input Int of the microprocessor MP. This connection serves as a separate control line by which line the data transmission circuit HDLC is enabled to interrupt the microprocessor MP. Thereupon, the microprocessor MP will take over controlling data transmission routines within the multi-address circuit TTU as will be described later in more detail.

In the following there will be described the mode of operation of this apparatus. The main functions of the electronic data digital switching system EDS are well known and will not be described in detail. However, for better understanding of the invention, the basics of the transmission procedures for establishing multi-address connections to data terminals, i.e. a teleprinter TX and an office Teletype station Ttx will be discussed.

Let it be assumed that the teleprinter Tx is sending a Teletype message with 50 baud. A message hereinafter is understood as a complete teleprinter. The data signals of this message including signalling information, address information of the data terminals to be called and text information are received by the electronic data switching system EDS at the respective line adapter SAGA1 connected to the calling teleprinter Tx.

The electronic data switching system EDS having analyzed the call to be a multi-address message switches the message to the multi-address circuit TTU simulating a teleprinter from the viewpoint of the data switching system EDS. Therefore, this data transmission is controlled by a normal operation of the electronic data switching system EDS, just as if a message between two teleprinters had been transmitted.

Accordingly, the message is transmitted from the respective line adapter SAGAn assigned to the multi-address circuit TTU to its first interface circuit USARTa. This first interface circuit converts the digital signals, received in series, into a parallel form, for example into 8 bit data words assuming an 8 bit data structure of the microprocessor system. The converted data signals are then transmitted via the bus structure to the main memory RAM. In so doing, all digital signals belonging to this message are stored in the memory prior to any multi-address transmission procedure.

After having stored the entire message, including the data information to be transmitted to the called data terminals and the identification information, i.e. the call numbers of the data terminals to be called and possibly also the call number of the calling data terminal, the multi-address transmitting operation can be started. In principle, one data terminal after the other is selected for request by the multi-address circuit based upon the stored identification information. Upon request the electronic data switching system EDS establishes in sequence single line connections to each data terminal to be called and the data information stored in the main memory RAM is transmitted to the connected data terminal.

This data information is delivered, via the data bus line DB either to the first interface circuit USARTa or to the second interface circuit composed of the data transmission circuit HDLC and the signalization-conversion circuit USARTd, depending on whether the respective receiving data terminal is a teleprinter Tx or an office Teletype station Ttx. The message undergoes a parallel-to-serial conversion in the first interface circuit USARTa before it is supplied to the electronic data switching system EDS, if the receiving data terminal is a teleprinter Tx. Otherwise, the message is read out to the data transmission circuit HDLC where it is converted into series form and where it is reformatted. The reformatting results in delivering the message in a suitable format for a data transmission to an office Teletype station Ttx. The reformatted message is transmitted via the correspondingly set multiplexor network MUX to the data switching system EDS.

The interface circuit that is used to deliver the message from the main memory RAM to the electronic data switching system EDS depends upon the called type of data terminal. This selection is controlled by the microprocessor MP based upon the identification information stored in the main memory RAM. It may be noted that signalling information of a call request for an office Teletype station Ttx is passed via the signalization-conversion circuit USARTd, the appropriately set multiplexor network MUX to the electronic data switching system EDS. As the electronic data switching system EDS receives the signalling information in the appropriate form for the called type of data terminal, the electronic data switching system EDS thereupon is capable of establishing a line connection to the called office Teletype station Ttx.

It has been assumed in the discussion above that a teleprinter Tx requested a multi-address operation. For a multi-address operation requested by an office Teletype station Ttx the following procedure takes place:

Since this multi-address operation is requested by an office Teletype station Ttx, reformatting of the stored message before transmitting it to a teleprinter Tx is necessary. This format transformation is processed by the second interface circuit composed of the signalization-conversion circuit USARTd and the data transmission circuit HDLC. If the message is to be supplied to an office Teletype station, such reformatting is unnecessary, as the addressed data terminal and the requesting data terminal operate with the data transmission procedure. In either case, however, both circuits USARTd and HDLC of the second interface circuit perform a series-parallel conversion of the incoming data signals to match the requirements of the bus structure.

In this connection the following is noted: Preferably the digital signals of the entire message are stored both in the original and the converted format in the main memory RAM, so that in either case, the one or the other corresponding part of digital signals may be read out from this memory depending on the type of the called data terminal. The control function of the microprocessor system for switching both the signalization-conversion circuit USARTd and the data transmission circuit HDLC in operable condition in accordance with the nature of digital signals to be transmitted has not yet been considered in detail. Appropriate control is supplied by the microprocessor MP via the control bus line CB to the mentioned circuits USARTd and HDLC. The microprocessor MP delivers such control signals at certain times during the respective transmission of digital signals to or from the main memory RAM. One type of control signals is received by the signalization-conversion circuit USARTd during a so-called signalization phase and a corresponding second type of control signals is received by the data transmission circuit HDLC during the phase of transmitting the text information of the multi-address message. The control signals supplied to the signalization-conversion circuit USARTd occur during each signalization phase, i.e. during the time span of the delivery of the signalling information from or to the main memory RAM. Both interface circuits can be designed for recognizing the occurrence of the signalling information and for delivering corresponding information signals to the interrupt input Int of the microprocessor MP.

Furthermore, it has yet not been considered how multi-address operations initially are established, i.e. how the multi-address circuit TTU is reached by a data terminal requesting multi-address operation. It has been pointed out that the multi-address circuit TTU is acting like any other remote data terminal from the viewpoint of the electronic data switching system EDS. This means apparently that each data terminal connected to the electronic data switching system EDS can request a connection to the multi-address circuit TTU by dialing a special call number designating the multi-address circuit. Having been connected to the multi-address circuit TTU, the calling data terminal transmits the data information to be distributed and at least the call number of the data terminals which are to receive the message. Then the connection between the requesting data terminal and the multi-address circuit TTU can be released.

Thereupon, by control of the multi-address circuit TTU, the multi-address operation is carried out as described above in detail. It may be provided that repeated attempts at making connections are made in case the respective receiving data terminal happens to be busy just when it is requested for the multi-address transmission. Having delivered the multi-address message to all the receiving data terminals, or at least after attempts have been made to non-available data terminals to deliver the respective message, a protocol can be supplied to the requesting data terminal. This protocol will show which of the data terminals have received the message and which terminals have not been reached. To this end, use is made of the call numbers of the respective receiving data terminals previously recorded in the multi-address circuit TTU and of the call number of the requesting data terminal.

While the multi-address circuit herein described constitutes a preferred embodiment of the invention, it is to be understood that the invention is not limited to this precise design. For example, the main memory has been considered as a single memory. It will be understood by those skilled in the art that this memory could also be composed of two partial memories, one of which memories records the identification information—i.e. call numbers of the requesting data terminal and the called data terminals, while the other memory serves to store the text information. The invention is also not restricted to switching procedures between only teleprinters and office Teletype stations; there can also be data transmission between other types of data terminals. Furthermore, the described signalling and data transmission procedures may be replaced by other known procedures to switch data from one data terminal to another. Known electronic data switching sytems are designed such that they can perform a variety of these procedures and those skilled in the art know the actual designs for controlling these procedures. The multi-address circuit mainly composed of a programmable control unit and specialized interface circuits has merely to simulate different types of data terminals. Data transmission procedures which have to be matched are well defined and those skilled in the art will be capable of designing control operations for multi-address switching according to these procedures.

Therefore, the actual design of the multi-address circuit can be performed accordingly by suitable adjustments. It may be also understood that the multi-address circuit may comprise a variety of interface circuits if more than two types of data terminals are to communicate with each other. The necessary programming routines are so well known from the principles of electronic digital data switching systems that those skilled in the art just have to adjust these known routines to the actual application.

We claim:

1. A circuit arrangement for multi-address switching operations of a message composed of digital encoded signals between a calling data terminal and a variety of called data terminals operating with different data transmission procedures including signalling, data format and data transmission rate, said circuit arrangement adapted for use with an electronic data switching system and comprising in combination:
   (a) at least two interface circuits each having an external interface input, an external interface output, an internal interface input, an internal interface output and an interface control terminal, and each having input/output converting networks connected to said interface inputs and outputs, each of said external interface inputs being adapted for connection with respective output means of the electronic data switching system for receiving digital signals from one type of data terminal and each of said external interface outputs being adapted for connection with respective input means of the electronic data switching system for transmitting digital signals to said type of data terminal;
   (b) storage means for storing the message being sent from the calling data terminal and including data information to be transmitted and identification information of the called data terminals, said storage means having a storage input, a storage output and a storage control terminal, said internal interface input and said storage input being connected in parallel to said storage output and said internal interface output respectively; and
   (c) control means for controlling the input/output operations of said storage means such that said data information is sent out in sequence to each of the called data terminals one after another by means of a separate line connection across the respective interface circuit assigned to the currently called type of data terminal and with a data transmission procedure associated with the currently called type of data terminal.

2. The circuit arrangement as recited in claim 1, wherein at least a first interface circuit further comprises an input/output converting network designed for converting both signalling information and data information.

3. The circuit arrangement as recited in claim 2, wherein at least a second interface circuit further comprises:
   (a) a second input/output converting network for converting signalling information identifying called data terminals; and
   (b) a transmitting network arranged in parallel with that second input/output converting network for changing the data format of data information and for transmitting data information to a called data terminal.

4. The circuit arrangement as recited in claim 3, wherein said second interface circuit further comprises a multiplexor network having two multiplexor inputs and one multiplexor output, each of said multiplexor inputs connected to an output of the second input/output converting network and the transmitting network, respectively, and said multiplexor output forming the external interface output of said second interface circuit and being adapted for connection with said input means for transmitting digital signals to the electronic data switching system, whereby the multiplexor network is controlled to selectively couple said second input/output converting network and said transmitting network to said input means.

5. The circuit arrangement as recited in claim 4, wherein said control means comprises a microprocessor system.

6. The circuit arrangement as recited in claim 5, wherein the microprocessor system comprises a processor unit, a separate control memory for storing control routines of data transmission procedures and multi-address switching routines, and a bus structure having address lines, data lines, and control lines to which lines respective inputs and outputs of the processor unit, the control memory, the storage unit means and the respective ones of said internal interface inputs and outputs and said interface control terminals are connected in parallel.

7. The circuit arrangement as recited in claim 6, wherein said processor unit, upon request of a busy interface circuit, allocates access to the bus structure as to connect the storage unit means to the requesting interface circuit for buffering the message and then to respective interface circuits for multi-address transmitting of the buffered data information in sequence, each of said interface circuits being assigned to a called type of data terminal.

8. The circuit arrangement as recited in claim 7, wherein said processor unit has at least one interrupt input, and at least one interface circuit has a separate control output, said interrupt input and said control output being connected by a separate control line.

9. The circuit arrangement as recited in any one of the claims 1-8, wherein each of the input means for receiving digital signals and each of the output means for transmitting digital signals connected to an interface circuit comprises one line adapter of a different set of said line adapters forming the connection unit of the electronic data switching system for one type of data terminal, and wherein a multi-address message from a data terminal received by one line adapter is transmitted to the circuit arrangement for multi-address switching across the line adapter connected to the respective interface circuit and, after having been stored, the data information of said message is read out in sequence to a line adapter of the line adapter set forming the connection unit for the type of data terminal receiving the currently transmitted data information.

10. A method for performing multi-address switching operation of a message composed of digital encoded signals between a calling data terminal and a variety of called data terminals operating with different transmission procedures including signalling, data format and data transmission rate controlled by an electronic data switching system serving different types of data terminals and having a respective set of line adapters for each different type of data terminals, said method comprising the steps of:
 (a) sending a call request and signalling information from a calling data terminal to a first line adapter belonging to the set of line adapters assigned to the sending type of data terminal;
 (b) analyzing the information by the electronic data switching system and setting up a line connection from said first line adapter across a second line adapter of the same set of line adapters to a circuit arrangement for multi-address switching operations connected to all line adapter sets by respective line adapters;
 (c) transmitting the message including identification information of data terminals to be called and data information to be distributed into said circuit arrangement and storing the message temporarily;
 (d) selecting by said circuit arrangement based upon the said identification information, a receiving line adapter of the line adapter set assigned to the receiving type of data terminal;
 (e) sending the data information forming a part of the message converted according to the data transmission procedure of the receiving type of data terminal to the selected receiving line adapter;
 (f) switching the data information under control of the electronic data switching system to the receiving data terminal, thereby using the normal control facilities of said data switching system; and
 (g) repeating the steps (d) to (f) in sequence for transmitting the data information to different data terminals at least until all available data terminals identified by the identification information have received the data information.

11. The method for switching digital encoded signals as recited in claim 10, wherein step (c) and step (d) are carried out under the control of the circuit arrangement for multi-address switching operation which comprises an independent processing system having interface circuits being assigned to a respective line adapter set to perform data input/output operations according to different data transmission procedures.

* * * * *